2,940,948
PREPARATION OF POLYVINYL ALCOHOL

Paul Halbig and Paul Wicht, Freiburg, Switzerland, assignors to Lonza Electric and Chemical Works Ltd., Basel, Switzerland No Drawing. Filed May 11, 1956, Ser. No. 584,163

Claims priority, application Switzerland May 12, 1955

7 Claims. (Cl. 260—29.6)

The invention relates to improvements in the preparation of polyvinyl alcohol.

The general procedure for the preparation of polyvinyl alcohol consists in the saponification of polyvinyl alcohol esters, as first described by Herrmann and Haehnel in Ber. 60, 1658 (1927). The saponification can be carried out with acid or alkaline catalysts or so-called fat splitting agents in the presence of water or alcohols. It proceeds at a particularly fast rate with anhydrous methanol or ethanol. This procedure is called also ester exchange or alcoholysis (see the book of F. Krczil on Einstoffpolymerisation, Leipzig, 1940, Akademische Verlagsgesellschaft, pp. 406–414).

The polyvinyl esters, particularly the polyvinyl acetate generally used for the preparation of polyvinyl alcohol, are preferably prepared by polymerization of the monomeric vinyl ester in aqueous medium (see l.c., p. 633 ff.). In this manner, aqueous dispersions containing 40 to 60 percent by weight of polyvinyl ester are readily obtained. Therefore, procedures have also been developed to saponify the polyvinyl ester in such aqueous dispersions, whereby mineral acid catalysts or so-called fat splitting agents were used (see l.c., p. 412, and German Patent No. 895,980).

However, the known procedures present considerable drawbacks. For instance, it is necessary to operate at the boiling point of the aqueous reaction mass or at still higher temperatures to obtain a satisfactory rate of saponification; this results in discoloration and contamination of the end product and the simultaneous presence of mineral acid and acetic acid frequently causes corrosion of the employed apparatus. A further drawback is the necessary removal of the mineral acid used as a catalyst when pure polyvinyl alcohol is to be obtained. For this purpose, generally a dialysis procedure is used, or the polyvinyl alcohol is precipitated from its aqueous solution by large amounts of water soluble compounds which have no dissolving action on the polyvinyl alcohol, such as methanol, acetone, and the like. These procedures involve the difficulty that a part of the acid catalyst is chemically bound to the polyvinyl alcohol and affects the thermal stability of the same.

It is a principal object of the invention to provide a method for the preparation of polyvinyl alcohol from aqueous dispersions of polyvinyl esters, particularly polyvinyl acetate, which avoids the drawbacks set forth hereinabove.

Other objects and advantages will be apparent from the specification and claims.

We have found that polyvinyl esters in form of their aqueous dispersions containing about 40 to 60 percent by weight of the ester can be split at a temperature not exceeding +5° C. with small amounts of alkali hydroxide in the presence of lower aliphatic alcohols into polyvinyl alcohol and esters of said lower aliphatic alcohols. For this reaction, alkali hydroxide is required only in small amounts, which generally should be below about 2.5 percent by weight, calculated on the polyvinyl ester.

It is of advantage to employ not more than 0.06 mole, preferably 0.02 to 0.05 mole of alkali hydroxide for each carboxylic group of the polymer molecule. This is very surprising because it was to be expected that in presence of a large amount of water only the normal saponification with formation of the alkali salt of the carboxylic acid would take place, which requires the consumption of 1 mole of alkali hydroxide per carboxylic group. However, in spite of the large amount of water present, a typical alcoholysis catalyzed by traces of alkali, takes place.

The success of the procedure depends on the maintenance of certain temperatures and concentrations. The temperature during the saponification must not exceed 5° C., at least not for a longer period of time. The lower temperature limit is determined by the rate of reaction. At −10° C., it is still possible to carry out the reaction satisfactorily. The amount of water should not be more than 1.5 times and not less than .6 times of the amount of the polyvinyl ester. If the amount of water is excessive, the alkali hydroxide is consumed too quickly; if it is too small, the reacting mass becomes too thick and viscous, which makes it impossible to work in conventional agitators. In such a case, it becomes necessary to use kneading machines, which increases the cost of the process. The amount by weight of the lower aliphatic alcohol, such as methanol, ethanol, isopropanol, should advantageously at least be equal to that of the polymer. The smaller the amount of alcohol is, the lower is the saponification degree. The latter is expressed by a figure defining the content of vinyl acetate groups in the end product as percentage by weight.

The saponification degree can be adjusted by the reaction time and temperature and also by the amount of catalyst used. This relationship is illustrated in the table of Example 3, below. In order to obtain a substantially complete saponification, the volatile aliphatic esters can be distilled off in vacuo and replaced by fresh alcohol.

In the processes of the type here involved, it is important that as little foreign matter as possible is present in the reacting mass because the removal thereof from polyvinyl alcohol would require complicated manipulations. This condition is satisfied by the present method. We have found that the presence of small amounts of monovinyl acetate in the starting dispersion does not affect the results, due to the low reaction temperature. The alkali metal hydroxide used as catalyst is converted in the reaction to the alkali metal salt of the respective carboxylic acid, for instance to alkali metal acetate; its presence in polyvinyl alcohol is harmless for quite a number of its applications. However, if desired, it can readily be removed by treating the aqueous solution with one of the conventional anion or cation active ion exchange resins available in commerce. We have found the ion exchange resin sold by Rohm & Haas Co., of Philadelphia, under the trademark "Amberlite 1R 120" particularly suitable. Said resin is a strongly acid sulfonated polystyrene and well adapted for the removal of sodium ions.

By precipitation with non-solvents, such as methanol or acetone, or by evaporation, the polyvinyl alcohol may be recovered in the solid state from the reacted mass or the solutions.

Generally polyvinyl acetate will be used for the process. But esters of other lower aliphatic acids, such as the formate or propionate, may also be used.

The following examples are given to illustrate preferred methods of carrying out the invention, it being understood that the invention is not to be limited to the details given therein.

EXAMPLE 1

40 kg. of water, in which 2 kg. of polyvinyl alcohol and .1 kg. of 30% hydrogen peroxide are dissolved, are stirred with 60 kg. of vinyl acetate at a temperature of 60 to 80° C. until the monomer is substantially polymerized and a fine dispersion has been obtained. The not polymerized monomer is blown off with air. 220 kg. of methanol are added to said dispersion with cooling and stirring. Hereby, the dispersion is converted to an almost clear solution. After cooling to 0° C., a solution of 1.2 kg. of caustic soda in 20 kg. of methanol and 2 kg. of water is added. The batch is stirred for 5 hours at 0° C., whereby the solution is converted to a gelatinous but readily stirrable mass. Subsequently, 50 kg. of water are added, and the formed methyl acetate and the excess methanol are distilled off with simultaneous slow stirring. After dilution with water, a 10% polyvinyl alcohol solution is obtained. The polyvinyl alcohol contains still 15 percent of vinyl acetate groups.

EXAMPLE 2

The procedure is as set forth in Example 1, but the temperature during saponification is maintained at 5° C. After 3.5 hours, the reaction is terminated by addition of a large amount of water and distillation of the methyl acetate and methanol. The obtained polyvinyl alcohol contains still 20 percent of vinyl acetate groups.

EXAMPLE 3

The following table shows the saponification degree as a function of the amount of methanol, sodium hydroxide, the reaction time, and reaction temperature, respectively. For the tests, we used always 600 g. of polyvinyl acetate and 400 g. of water in form of a dispersion prepared according to Example 1. The reaction was carried out as set forth in Example 1, and it was interrupted by addition of dilute acetic acid after the period of time indicated. Separate tests showed that the degree of polymerization had no substantial influence on the saponification degree.

*Table*

| Saponification temperature in ° C. | Time of saponification in hours | Amount of methanol in g. | NaOH in g. | Vinyl acetate groups in percent |
| --- | --- | --- | --- | --- |
| −10 | 18 | 2,200 | 12 | 4 |
| −5 | 12 | 2,200 | 12 | 7 |
| −5 | 8 | 2,000 | 12 | 10 |
| 0 | 5 | 2,200 | 12 | 15 |
| 0 | 4 | 2,200 | 12 | 20 |
| 0 | 4 | 1,000 | 12 | 30 |
| 0 | 7 | 2,200 | 10.5 | 18 |
| 0 | 8 | 2,200 | 9 | 27.5 |
| +5 | 4 | 2,500 | 12 | 20 |
| +5 | 5 | 4,000 | 12 | 17 |
| +5 | 3.5 | 2,500 | 12 | 23 |
| +5 | 5 | 2,200 | 10.5 | 28 |

EXAMPLE 4

A suspension of polyvinyl acetate pearls is prepared in known manner from 50 kg. of water, 0.5 kg. of polyvinyl alcohol, 50 kg. of vinyl acetate, and 0.1 kg. of lauryl peroxide. The unpolymerized vinyl acetate is blown off as completely as possible with steam. By addition of 150 kg. of methanol, said suspension is converted to a homogeneous solution. Said solution is cooled to 0° C., and 0.5 kg. of NaOH, dissolved in 9 kg. of methanol and 1 kg. of water is added. After stirring two hours at 0° C., one begins distilling off methylacetate and methanol by means of a column at a pressure of about 50 mm. Hg below atmospheric pressure. In intervals of 30 minutes, four times 25 kg. each of fresh methanol containing .15 kg. of sodium hydroxide are added. The distillation is continued. After 4 hours of total reaction time methanol and methyl acetate are evaporated at atmospheric pressure as completely as possible, and the residue is taken up in water. In this manner, polyvinyl alcohol containing less than 1 percent of vinyl acetate groups is obtained.

EXAMPLE 5

One liter of a polyvinyl alcohol solution prepared according to Example 1 is stirred with 130 cc. of the Amberlite 1R 120 defined hereinabove at 50° C. for a period of 30 minutes. On filtering, a polyvinyl alcohol solution is obtained which is free of sodium ions. On evaporation of the water, said solution leaves a film of particularly good heat stability. It can be heated, for instance, for 15 minutes at 200° C. without showing discoloration.

We claim:

1. A method of preparing water soluble polyvinyl alcohol containing less than 30 percent by weight of vinyl ester groups, said method comprising reacting an aqueous dispersion containing about 40 to 60 percent of a polyvinyl ester of a saturated lower aliphatic monocarboxylic acid and about 60 to 40 percent by weight of water, with an amount at least equal to the amount of said polyvinyl ester, of a lower saturated aliphatic alcohol containing not more than 4 carbon atoms, in the presence of alkali metal hydroxide in an amount not exceeding 2.5 percent calculated on said polyvinyl ester, at a temperature of about −10° C. to about +5° C. until at least about 70 percent of the ester groups of said polyvinyl ester are saponified, thereby forming polyvinyl alcohol and the ester of said alcohol and said carboxylic acid, and removing said ester.

2. The method of claim 1 wherein the amount of said alkali metal hydroxide is 0.02 to 0.05 mole per polyvinyl ester group.

3. The method of claim 1 wherein the aqueous polyvinyl alcohol solution remaining after removal of said ester is treated with an ion exchange resin to remove the alkali metal ions contained in said solution.

4. A method of preparing water soluble polyvinyl alcohol comprising reacting an aqueous dispersion of polyvinyl acetate, which contains about 40 to 60 percent by weight of water, with methanol in an amount by weight at least equal to the amount of said polyvinyl acetate in the presence of alkali metal hydroxide as catalyst in an amount of about 0.6 to 2.5 percent by weight of said polyvinyl acetate at a temperature of about −10° C. to +5° C., until at least 70 percent of the vinyl acetate groups of said polyvinyl acetate are saponified, and distilling off the formed methyl acetate and unreacted methanol.

5. The method of claim 4 wherein 100 to 300 parts by weight of methanol are reacted with 100 parts of said aqueous dispersion.

6. The method of claim 4 including the step of diluting the polyvinyl alcohol remaining after distillation of said methyl acetate and methanol, with water.

7. A method of preparing water soluble polyvinyl alcohol according to claim 1, wherein an aqueous dispersion is used which has been obtained by polymerization of vinyl acetate in water.

References Cited in the file of this patent

UNITED STATES PATENTS

| | | |
| --- | --- | --- |
| 2,368,949 | Smith | Feb. 6, 1945 |
| 2,467,774 | Plambeck | Apr. 19, 1949 |
| 2,643,994 | Germain | June 30, 1953 |

OTHER REFERENCES

Amberlite Exchange Resins, Rohm & Haas Co., Phila., Pa., September 15, 1953, page 5.